US012544860B2

(12) United States Patent
Dowling et al.

(10) Patent No.: US 12,544,860 B2
(45) Date of Patent: Feb. 10, 2026

(54) COMPUTER IMPLEMENTED METHOD OF GENERATING AN ARTICLE OF MANUFACTURE

(71) Applicant: EDRLL Limited, Monkstown (IE)

(72) Inventors: Ciara Dowling, Monkstown (IE); Kevin Burkitt, Monkstown (IE); Eoin Dowling, Monkstown (IE)

(73) Assignee: EDRLL LIMITED, Monkstown (IE)

( * ) Notice: Subject to any disclaimer, the term of this patent is extended or adjusted under 35 U.S.C. 154(b) by 510 days.

(21) Appl. No.: 17/842,326

(22) Filed: Jun. 16, 2022

(65) Prior Publication Data

US 2022/0402073 A1   Dec. 22, 2022

(30) Foreign Application Priority Data

Jun. 16, 2021   (GB) ...................................... 2108581

(51) Int. Cl.
*B44C 1/22*   (2006.01)
*A44C 27/00*   (2006.01)
*B23K 26/364*   (2014.01)

(52) U.S. Cl.
CPC ............ *B23K 26/364* (2015.10); *A44C 27/00* (2013.01); *B44C 1/228* (2013.01)

(58) Field of Classification Search
CPC ....... B23K 26/364; A44C 27/00; A44C 3/004; A44C 15/004; A44C 25/001; B44C 1/228; G06Q 30/0621
See application file for complete search history.

(56) References Cited

U.S. PATENT DOCUMENTS

| | | | | |
|---|---|---|---|---|
| 9,727,025 B1 * | 8/2017 | Rupert | ................... | G04B 49/04 |
| 2009/0048861 A1 * | 2/2009 | Lichtenheld | ........... | G06Q 30/06 |
| | | | | 705/300 |
| 2010/0235891 A1 * | 9/2010 | Oglesbee | .............. | H04W 4/029 |
| | | | | 707/610 |
| 2015/0229264 A1 * | 8/2015 | Truncale | ................. | F24S 50/20 |
| | | | | 700/275 |
| 2018/0027181 A1 * | 1/2018 | Roulet | ...................... | G06T 5/70 |
| | | | | 348/38 |
| 2020/0261785 A1 * | 8/2020 | Klemm | ............ | G06K 19/06037 |
| 2021/0379701 A1 * | 12/2021 | Iorio | ..................... | B23K 26/36 |

FOREIGN PATENT DOCUMENTS

| | | | | |
|---|---|---|---|---|
| EP | 4000943 A1 * | 5/2022 | ........... | B23K 26/032 |
| WO | WO-2020098921 A1 * | 5/2020 | ......... | G06Q 30/0621 |

* cited by examiner

*Primary Examiner* — Lee A Holly
(74) *Attorney, Agent, or Firm* — Brian J. Colandreo; Jeffrey T. Placker; Holland & Knight LLP

(57) ABSTRACT

This invention relates to a computer-implemented method of generating an article of manufacture. The method comprises the steps of receiving date and location data relating to a user event and thereafter accessing a star catalogue, determining the position of the stars relative to the date and location data, and projecting the star positions onto a two-dimensional (2D) plane. Once the star positions have been projected onto a 2D plane, the method comprises the steps of generating a computer-readable file for the star positions, providing the file to a laser engraving machine, and the laser-engraving machine engraving the article of manufacture according to the computer-readable file. The article of manufacture is preferably an item of jewellery such as a pendant. The method provides an efficient and cost-effective way of manufacturing a bespoke, high value item.

17 Claims, 9 Drawing Sheets

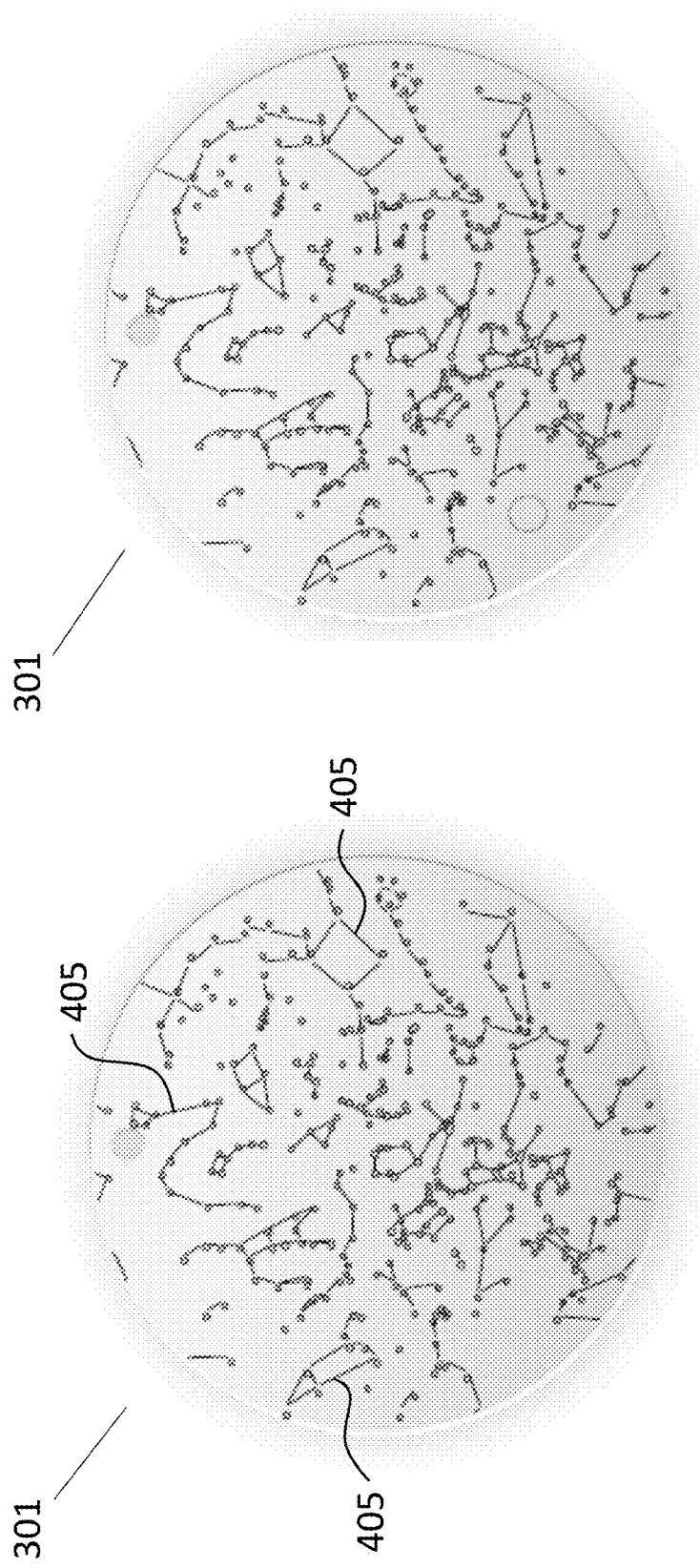

COMPUTER IMPLEMENTED METHOD OF GENERATING AN ARTICLE OF MANUFACTURE

RELATED APPLICATIONS

This application claims the benefit of United Kingdom Patent Application No. GB2108581.6 filed 16 Jun. 2021, which is hereby incorporated by reference in its entirety.

FIELD

This invention relates to a computer-implemented method of generating an article of manufacture. More specifically, the invention relates to a computer-implemented method of generating an article of jewellery.

BACKGROUND

Jewellery is often considered one of the most personal gifts that can be given from one person to another. Often, the gift of the item of jewellery is used to mark a special occasion such as, but not limited to, an anniversary, the birth of a child, a significant personal achievement or other milestone. The jewellery is often a high value item that engenders substantial goodwill, and the giving of which tends to form stronger relationship bonds between the giver and the recipient.

However, as any shopper for jewellery will attest, there is a plethora of choice when it comes to purchasing jewellery. Such is the abundance of choice, that it becomes increasingly difficult for new and innovative articles of jewellery to "stand out from the crowd". In addition, it becomes increasingly harder for the giver to select an item of jewellery that they believe is just right for the recipient. Due to the abundance of offerings available in the marketplace, some gift recipients may believe that it is implausible that the gift giver spent considerable time choosing a specific piece for the recipient, and the personal nature of the gift loses some of its cachet.

It is also known for individuals to purchase an item of jewellery for themselves to mark a special date or occasion in some way. It would be advantageous to be able to provide an item of jewellery that is highly personalised in such a way that it retains its cachet yet is still economical to produce at scale.

It is an object of the present invention to provide a computer-implemented method of generating an article of manufacture that overcomes at least some of these problems. It is a further object of the present invention to provide a computer-implemented method of generating an article of manufacture that provides a useful alternative choice to the consumer.

SUMMARY

According to the invention there is provided a computer-implemented method of generating an article of manufacture comprising the steps of:
  receiving a date and location data relating to a user event;
  accessing a star catalogue, determining a star position of a plurality of stars in the star catalogue relative to the date and location data;
  projecting the star positions of the plurality of stars onto a two-dimensional (2D) plane;
  generating a computer-readable file for the star positions;
  providing the computer-readable file to a laser engraving machine;
  the laser-engraving machine engraving the article of manufacture according to the computer-readable file.

By having such a method, it is possible to produce an article of manufacture, specifically an item of jewellery, that is highly personalised yet is economical to produce at scale. The item of jewellery may have intricate markings to engrave but these can be done in a simple and effective manner, thereby producing a superior item of jewellery at a reasonable cost that will maintain its cachet as a personalised gift.

In one embodiment of the invention there is provided a computer-implemented method in which the method comprises the additional step of receiving time data relating to a user event and the step of determining the position of the stars relative to the date and location data further comprises determining the positions of the stars relative to the time data and the date and location data. It is envisaged that it may be advantageous to provide the time as well as the date and location to enhance the personalized nature of the gift. It is possible to render the 2D plane with star positions specific to a particular time of day or night, thereby increasing the value of the gift.

In one embodiment of the invention there is provided a computer-implemented method in which the method comprises the intermediate step of rendering the 2D plane on a graphical user interface (GUI) of a user computing device (UCD). In this way, the purchaser of the article can view the rendered image of their gift before confirming the order.

In one embodiment of the invention there is provided a computer-implemented method in which the step of projecting the star positions onto a 2D plane comprises projecting one or more of: (i) star positions; (ii) constellation lines; (iii) equatorial grid overlay; (iv) azimuth grid overlay; (v) moon position; onto a 2D plane.

In this way, the personalised nature of the gift and aesthetic may be improved and/or altered to suit individual tastes and requirements by including some or all of the components onto the article of manufacture being created.

In one embodiment of the invention there is provided a computer-implemented method in which the step of generating a computer-readable file for the star positions comprises generating a computer-readable file containing one or more of: (i) star positions; (ii) constellation lines; (iii) equatorial grid overlay; (iv) azimuth grid overlay; (v) moon position.

In one embodiment of the invention there is provided a computer-implemented method in which the step of generating a computer-readable file comprises generating one or more of a DXF format file and a SVG format file. Other file formats are envisaged, such as, but not limited to XML, Ezcad or other formats suitable for the laser engraver control software. Indeed, in a greyscale embodiment of the invention, the image formats could be .jpg, .png or the like.

In one embodiment of the invention there is provided a computer-implemented method in which the method comprises the intermediate step of, prior to providing the computer-readable file to a laser engraving machine, passing the computer-readable file through an anti-overlap filter in which overlaps between stars, constellation lines and/or grid overlays are minimized. In one embodiment of the invention, the step of generating a computer-readable file comprises the step of applying anti-overlap filters to the data.

This is seen as a particularly important and advantageous aspect of the present invention. With certain types of engraving, overlapping components will likely lead to the creation of different visual effects or more deeply engraved marks in places. This is highly undesirable. By passing the file through an anti-overlap filter, it is possible to obviate many of the potential overlaps and ensure that a uniform product is produced. For example, the anti-overlap filter may omit certain stars from the star positions in the computer-readable file to prevent stars and grid lines overlapping.

In one embodiment of the invention there is provided a computer-implemented method in which the computer-readable file provided to the laser engraving machine comprises instructions to carry out the engraving in multiple stages. For example, the engraving could be carried out in a number of layers, with the background grid, stars and constellation lines all being engraved in separate, distinct stages. By carrying out the engraving in multiple stages, the laser may be controlled in a more efficient manner and may be used to simply provide different effects to the different components (e.g. depth and colour of laser engraved etch may vary for grid lines and constellation lines). It is believed that this produces a superior offering and a method of manufacture that is highly efficient and economical, and that reduces wear and tear on the laser.

In one embodiment of the invention there is provided a computer-implemented method in which the multiple stages comprise separate stages for two or more of: (i) star positions; (ii) constellation lines; (iii) equatorial grid overlay; (iv) azimuth grid overlay; (v) moon position.

In one embodiment of the invention there is provided a computer-implemented method in which the step of generating a computer-readable file for the star positions comprises generating an image of the star positions on a 2D plane and providing that image to the laser engraving machine for engraving. This is seen as a useful alternative way of creating the computer-readable file that will allow the article of manufacture to be produced. It is seen as a simple and efficient way to produce the article of manufacture.

In one embodiment of the invention there is provided a computer-implemented method in which the image is a grey scale image and the method comprises adjusting the power or duration of the laser engraving machine in line with the brightness of the greyscale image. Again, this is a simple and efficient alternative way of creating the article of manufacture although it is envisaged that the quality of the end product will be reduced and wear and tear on the laser may be increased.

In one embodiment of the invention there is provided a computer-implemented method in which the laser engraving machine is one of a laser etching machine, a laser engraving machine or a laser ablation machine.

In one embodiment of the invention there is provided a computer-implemented method in which the step of generating a computer-readable file for the star positions comprises incorporating instructions for one or more of laser speed; laser frequency; laser power level; and number of laser passes for the components to be engraved.

In one embodiment of the invention there is provided a computer-implemented method in which the step of providing the computer-readable file to a laser engraving machine further comprises including indicia to be engraved on the article of manufacture.

In one embodiment of the invention there is provided a computer-implemented method in which the step of the laser-engraving machine engraving the article of manufacture according to the computer-readable file further comprises the laser-engraving machine engraving the indicia onto the article of manufacture. The computer-readable file is imported into the laser-engraving machines control software to engrave the item and this may include indicia such as a person's name, an event name (e.g. "Our wedding day"), a time, a date and/or a location (in words and/or numerically with co-ordinates for location if desired), on part of the front surface or a rear surface of the article of manufacture.

In one embodiment of the invention there is provided a computer-implemented method in which the step of providing the computer-readable file to a laser engraving machine further comprises providing a computer-readable file containing a plurality of separate and distinct star position files. In this way, a plurality of articles of manufacture can be produced simultaneously with different star position designs, indicia and the like for the different star position files. This is seen as an efficient manufacturing process that will reduce time to manufacture as multiple articles can be produced in a single batch.

In one embodiment of the invention there is provided a computer-implemented method in which the method comprises the laser engraving machine engraving a plurality of articles of manufacture in a batch in accordance with the computer-readable file.

In this way, a plurality of articles of manufacture may be produced simultaneously in a more efficient and effective manner. The plurality of articles of manufacture may each be different to the others in the batch or alternatively, some or all of the articles in the batch could be identical to the others. For example, members of a football team that won an important match may have the same article of manufacture engraved with the same star positions and indicia (if provided). These may be engraved in a batch with other articles of manufacture with different markings thereon. Similarly, the method may be used to mass produce a batch of articles of manufacture for a concert to be sold as merchandise to the concert goers, or an event of general interest, such as a royal wedding or birth, a presidential inauguration, or the visit of a person of interest to large sections of the public (such as a Papal visit).

In one embodiment of the invention there is provided a computer-implemented method in which the plurality of articles of manufacture are engraved simultaneously.

In one embodiment of the invention there is provided a computer program product having program instructions stored thereon, that when loaded onto a computer, cause the computer to perform the steps of:
  receiving date and location data relating to a user event;
  accessing a star catalogue, determining the position of the stars relative to the date and location data;
  projecting the star positions onto a two-dimensional (2D) plane;
  generating a computer-readable file for the star positions;
  providing the computer-readable file to a laser engraving machine;
  the laser-engraving machine engraving the article of manufacture according to the computer-readable file.

In one embodiment of the invention there is provided a computing system comprising computing components for performing the computer-implemented method according to the computer-implemented method claims, the computing system comprising:
  a user computing device (UCD), the user computing device having a processor, a memory, a graphical user interface (GUI) and a communications module for communications with a remote device;
  a provider computing device (PCD) having access to a star catalogue, the PCD having a processor, a memory having at least one article of manufacture template stored thereon, and a communications module for communications with remote devices, the star catalogue accessible by the PCD containing astrometric and photometric data of a plurality of celestial bodies;

a laser engraving device (LED) with an accessible laser engraving peripheral device, the LED having a processor, a memory and a laser engraving application programming interface (API) for interfacing with the laser engraving peripheral device; and a communications network for each of the UCD, the PCD and the LED to communicate with one or more of the other of the UCD, the PCD and the LED over.

BRIEF DESCRIPTION OF THE DRAWINGS

The invention will now be more clearly understood from the following description of some embodiments thereof given by way of example only with reference to the accompanying drawings, in which:—

FIGS. 4(a) to 4(l) inclusive are diagrammatic representations of different articles of manufacture generated in accordance with the method according to the invention.

DETAILED DESCRIPTION

Figure 1:
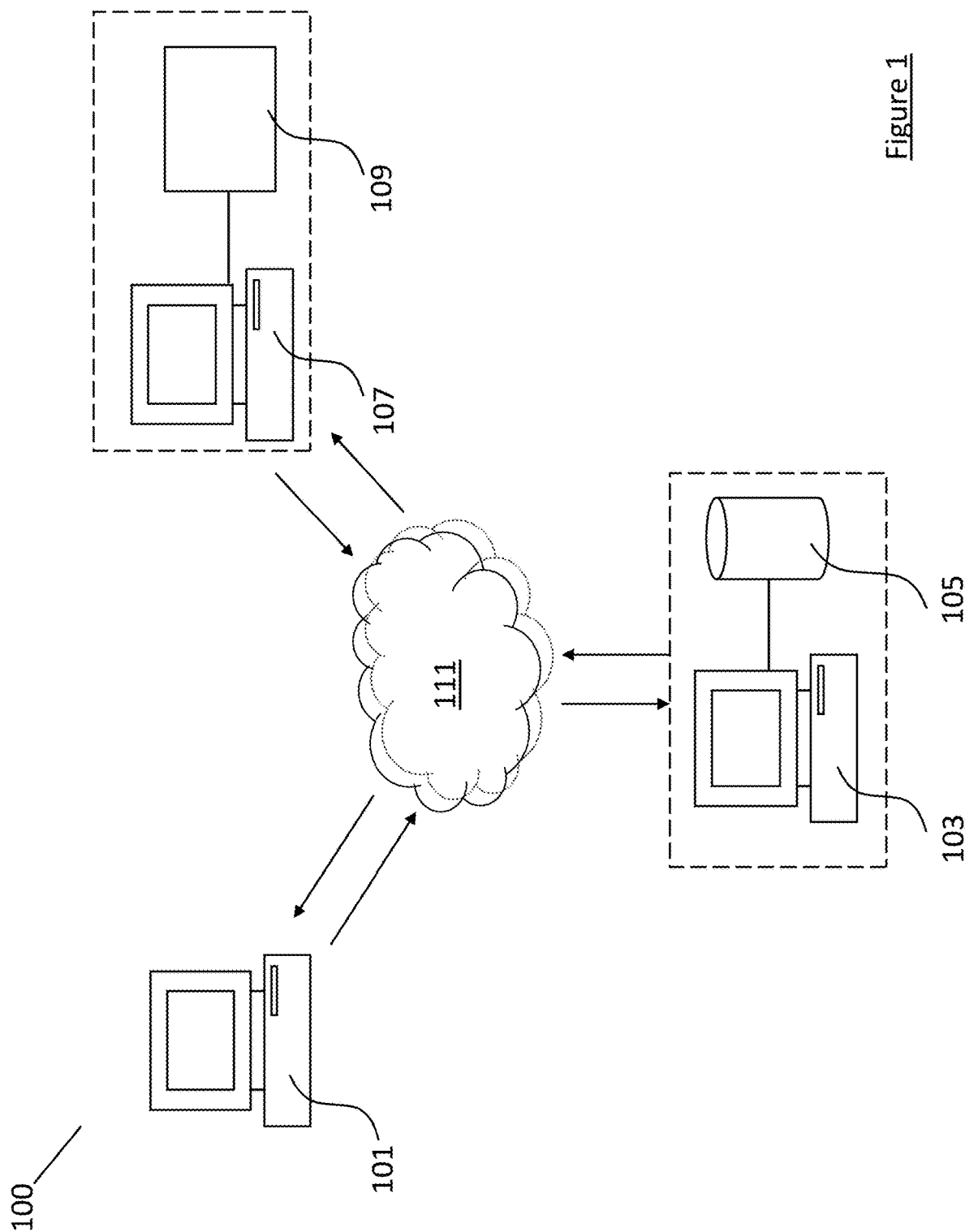
FIG. 1 is a diagrammatic representation of a system in which the computer-implemented method according to the invention may be performed.

Referring to FIG. 1, there is shown a diagrammatic representation of a computer system, indicated generally by the reference numeral 100, in which the computer-implemented method according to the invention may be performed. The system 100 comprises a user computing device (UCD) 101, a provider computing device (PCD) 103 having access to a star catalogue (also referred to as an astronomical catalogue) 105, and a laser engraving device (LED) 107 with an accessible laser engraving peripheral device 109. The UCD 101, PCD 103 and LED 107 communicate over a communications network 111.

The UCD 101 has a processor, a memory, a graphical user interface (GUI) and a communications module for communications with a remote device. The PCD 103 has a processor, a memory having at least one article of manufacture template stored thereon, and a communications module for communications with remote devices. The astronomical catalogue 105 accessible by the PCD 103 contains astrometric and photometric data of a plurality of celestial bodies. The LED 107 has a processor, a memory and a laser engraving application programming interface (API) for interfacing with the laser engraving peripheral device 109.

Figure 2:
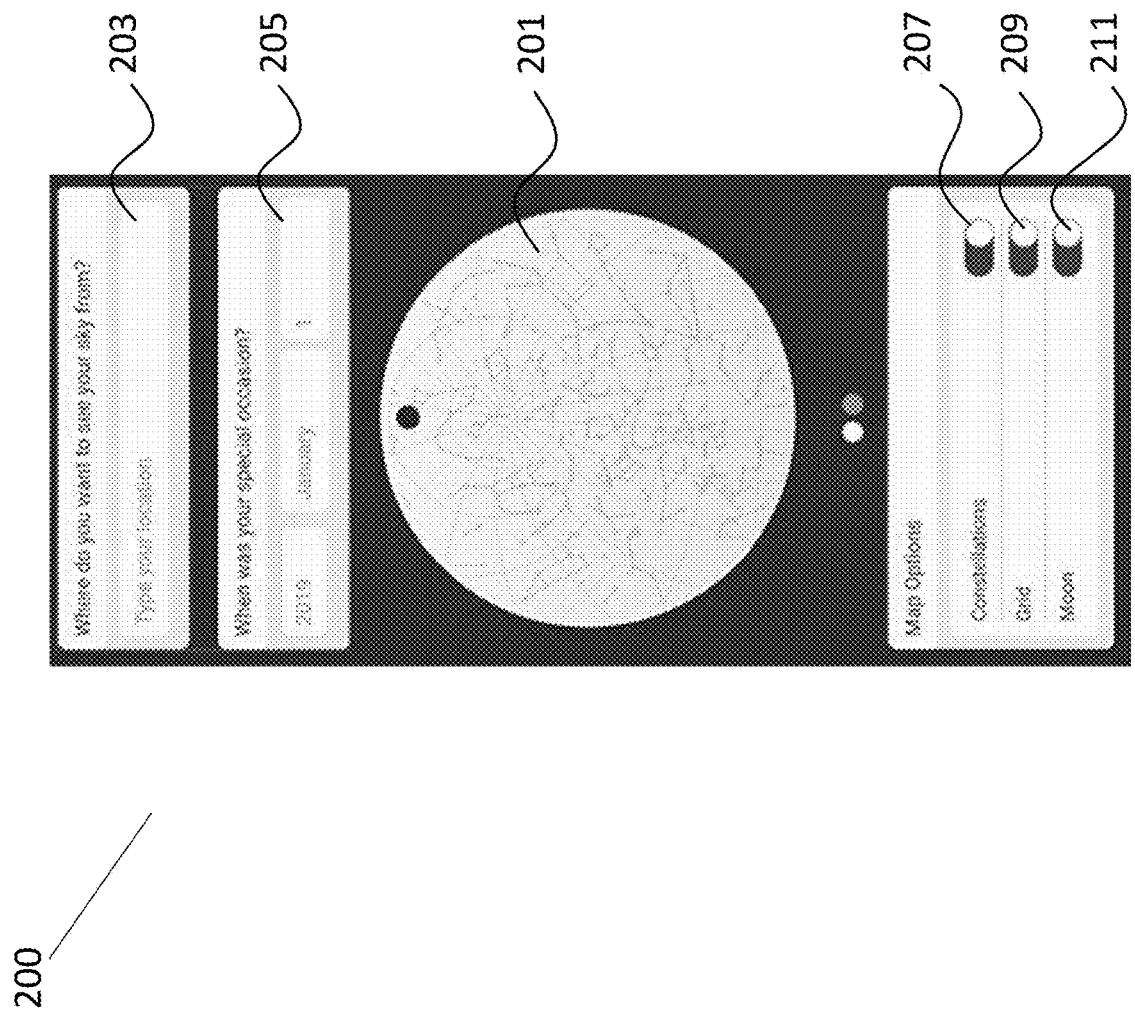
FIG. 2 is a diagrammatic representation of a user interface used in the computer implemented method according to the invention.

Referring to FIG. 2, there is shown a diagrammatic representation of a user interface used in the computer implemented method according to the invention, indicated generally by the reference numeral 200. The user interface comprises a graphical representation of the article of manufacture, in this instance, a pendant 201. There are a number of data entry fields 203, 205, 207, 209 and 211, including a location data entry field 203 in which the user can type the location of where the event occurred that they wish to view the stars from, a date data entry field 205 comprising a plurality of drop down lists that the user can populate by selecting the appropriate day, month and year of the event, a constellations data entry field 207, a grid data entry field 209 and a moon data entry field 211. The constellations data entry field 207, grid data entry field 209 and moon data entry field 211 are toggle switches that can be used to turn on or off the constellations, grid lines and moon components respectively.

Figure 3:
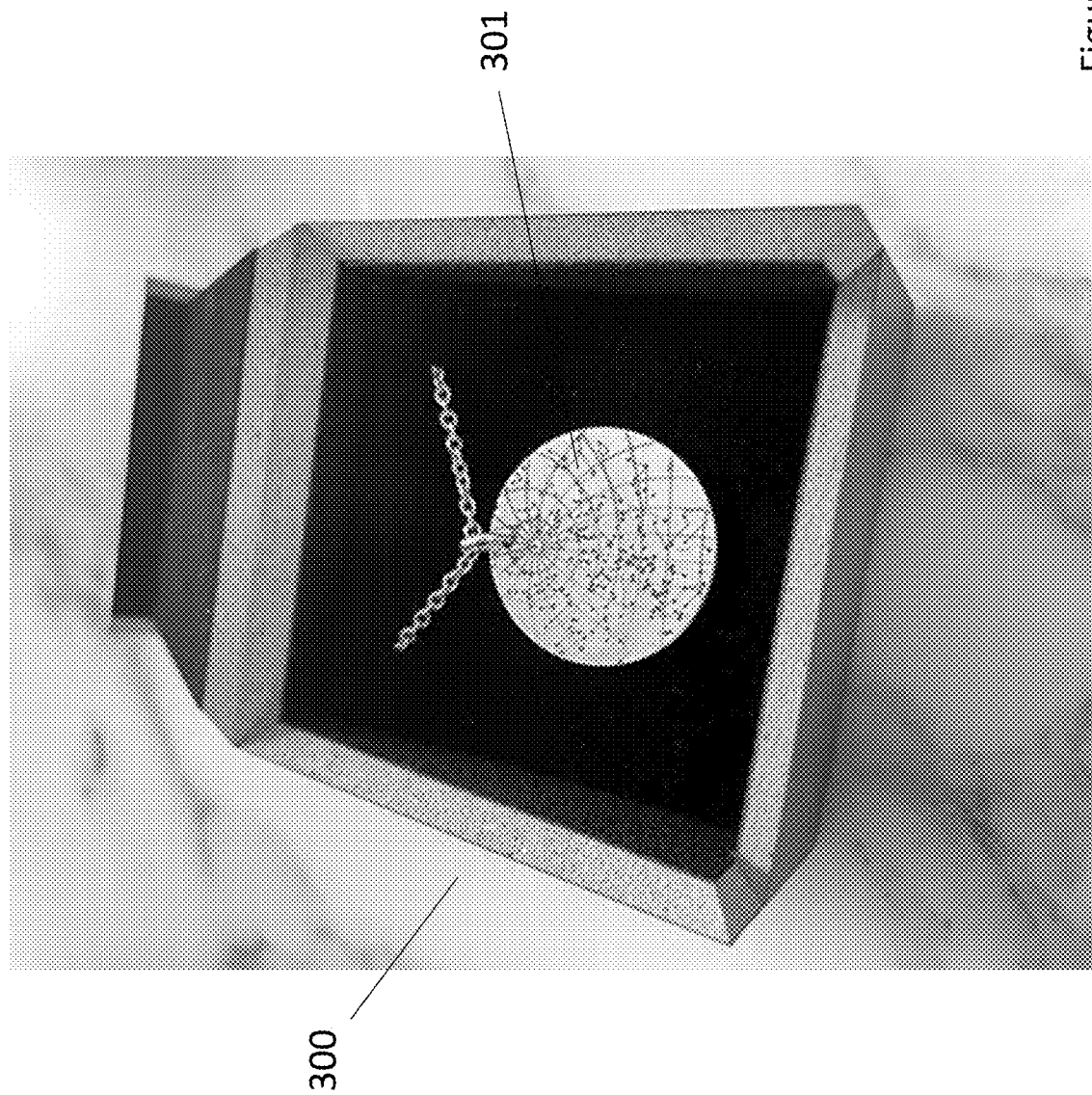
FIG. 3 is a photograph of an end product in a display box prepared for gifting.

In use, a user accesses the user interface and inserts the location and the date into the location data entry field 203 and the date data entry field 205 respectively. The method accesses the star catalogue and renders a 2 D image of the stars onto the pendant image 201. The user can then toggle on or off the constellations, grid and moon data entry fields to display or hide respectively the constellation lines, the grid lines and the moon from the pendant image 201. The user will be able to view the image of the pendant 201 that will be produced before proceeding to further screens for shipping and payment information. The screens relating to shipping and payment are well known in the art and further discussion is not deemed necessary for the understanding of the present invention. Once ordered, the pendant 301 may be packaged in a display box 300 (as illustrated in FIG. 3) and shipped to the intended destination.

Referring now to FIGS. 4(a) to 4(m) inclusive, there are shown diagrammatic representations of different articles of manufacture generated in accordance with the method according to the invention. In the embodiments shown, each of the articles of manufacture comprises a pendant however the information contained on the pendants differs from one drawing to the next.

Figure 4B:
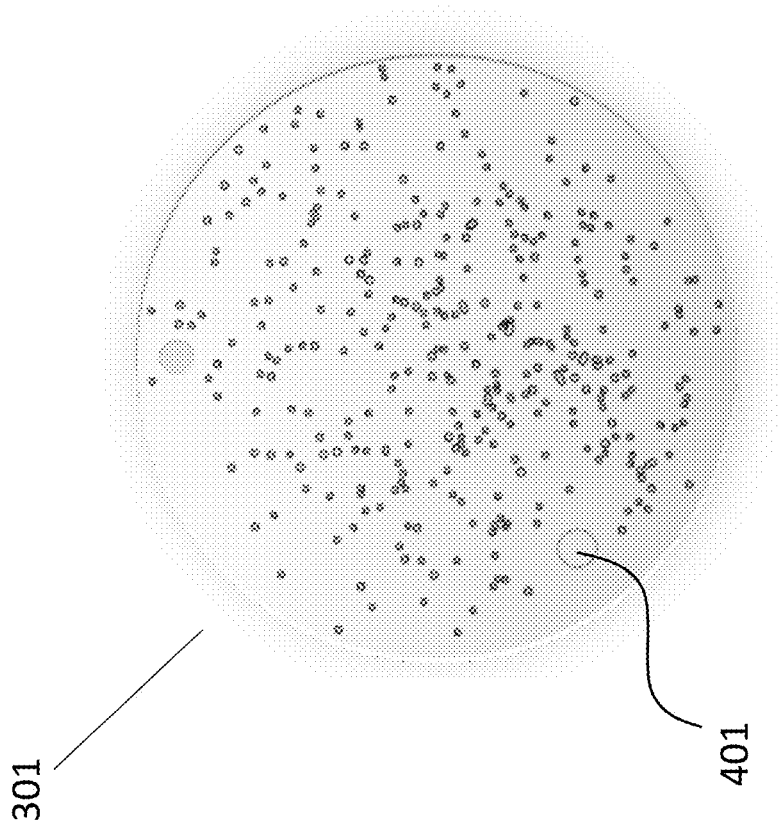
Figure 4A:
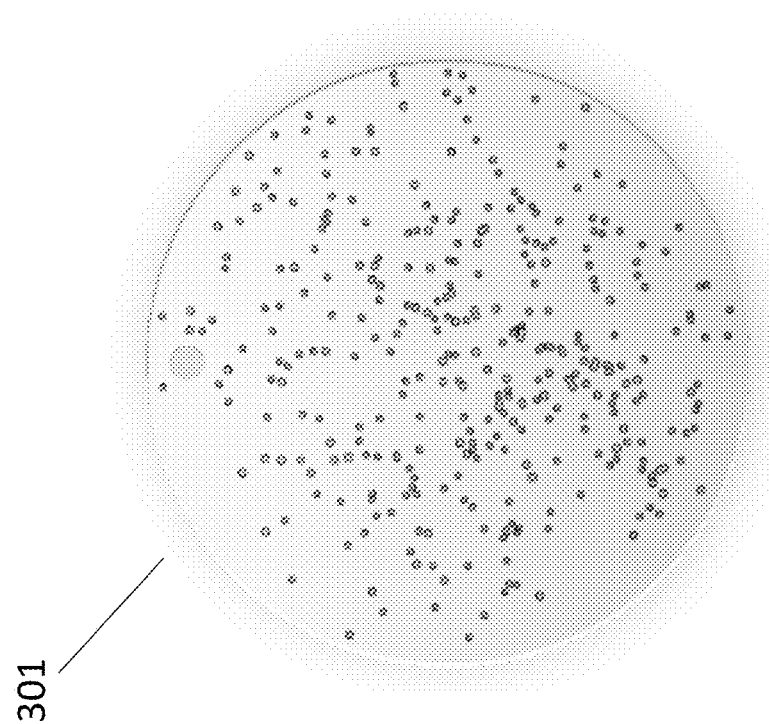
Figure 4D:
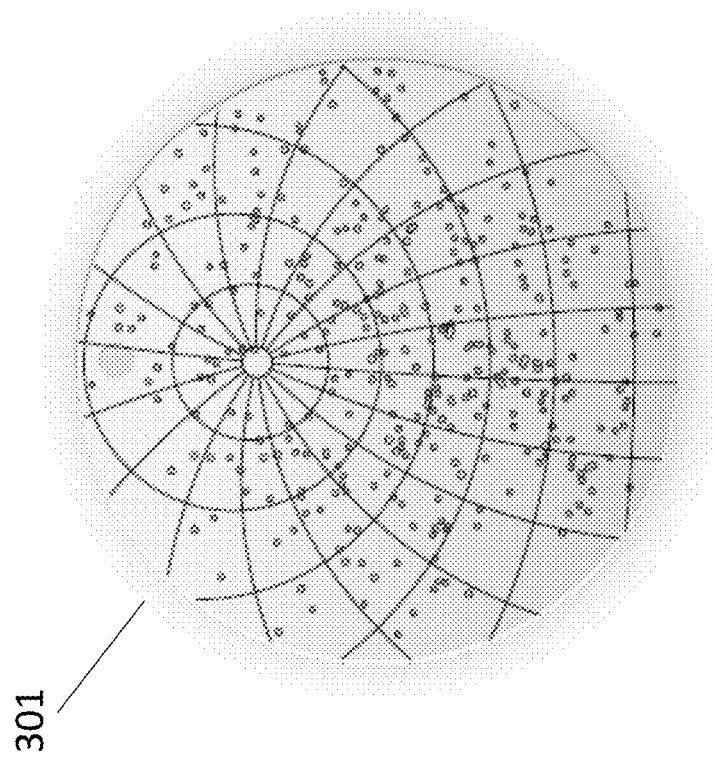
Figure 4C:
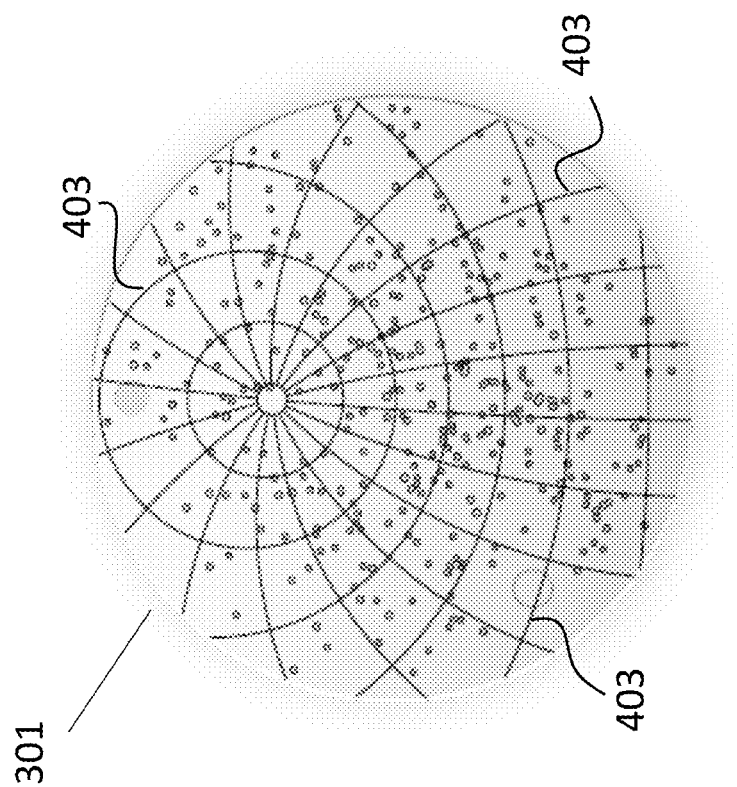
Figure 4H:
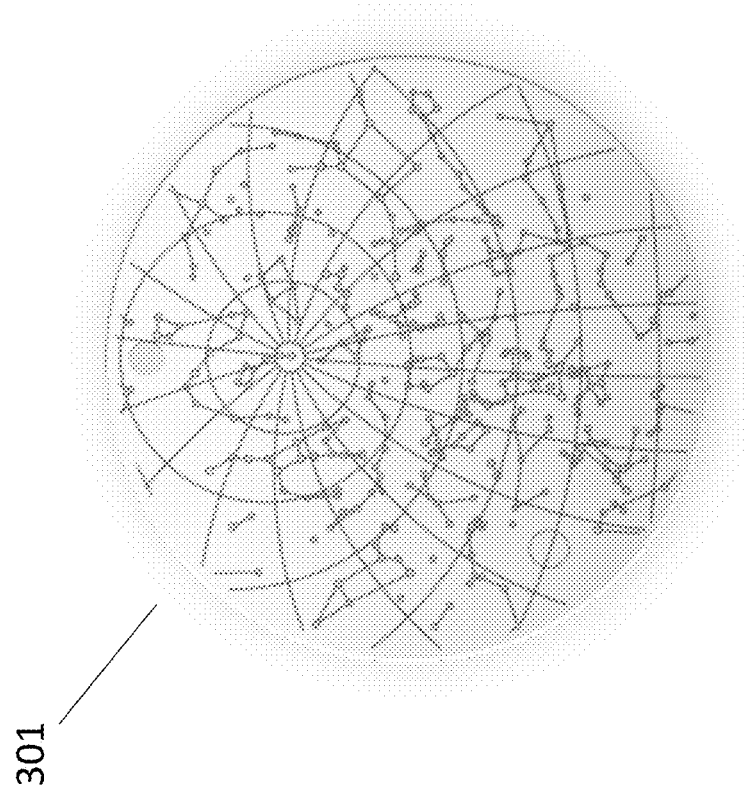
Figure 4G:
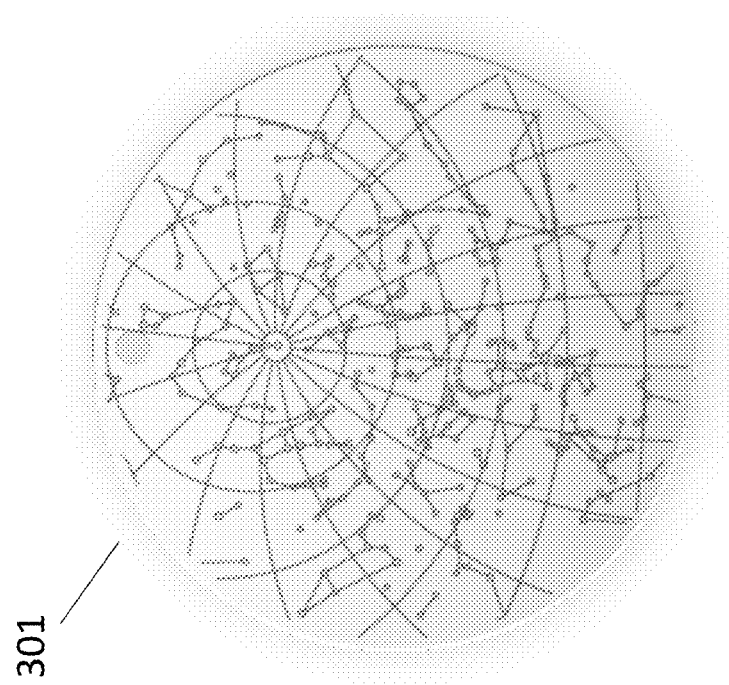
Figure 4I:
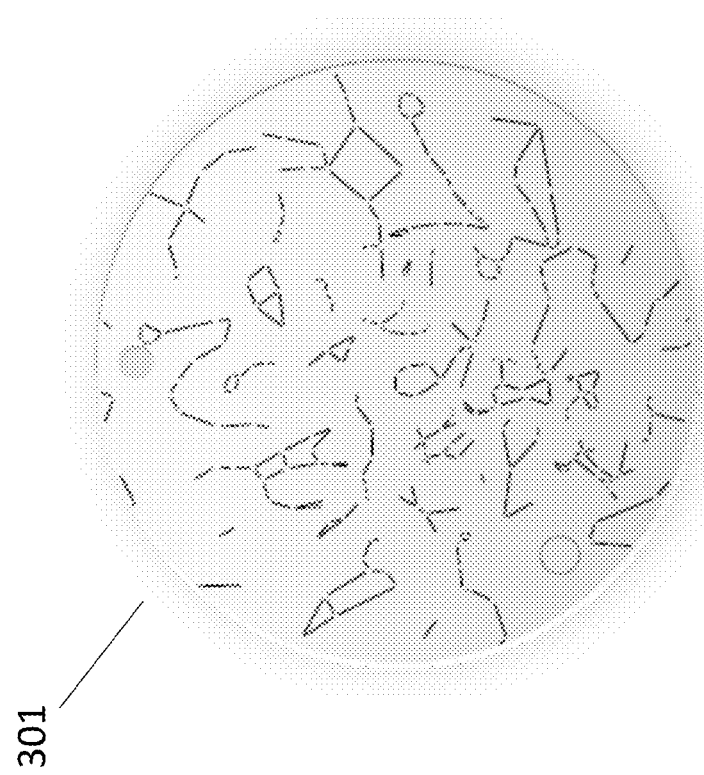
Figure 4I:
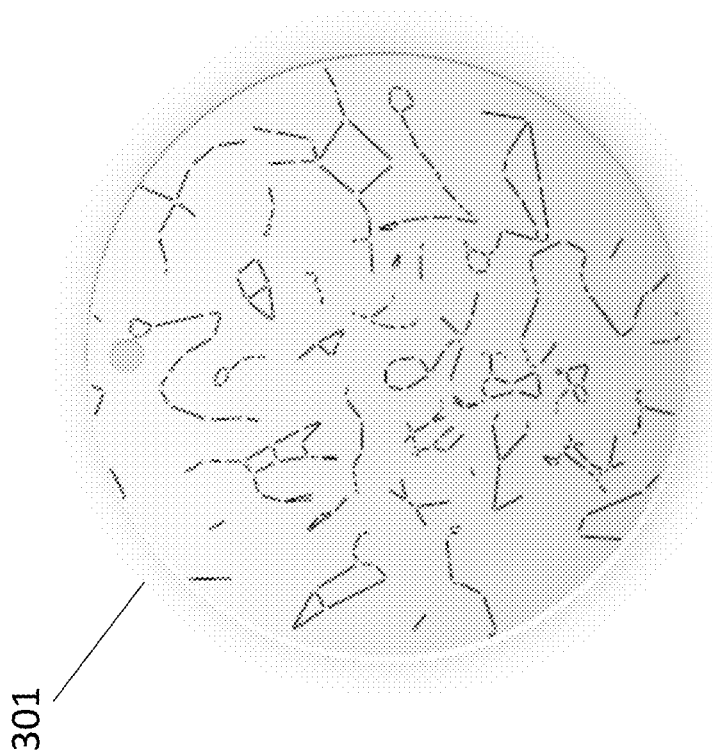
Figure 4L:
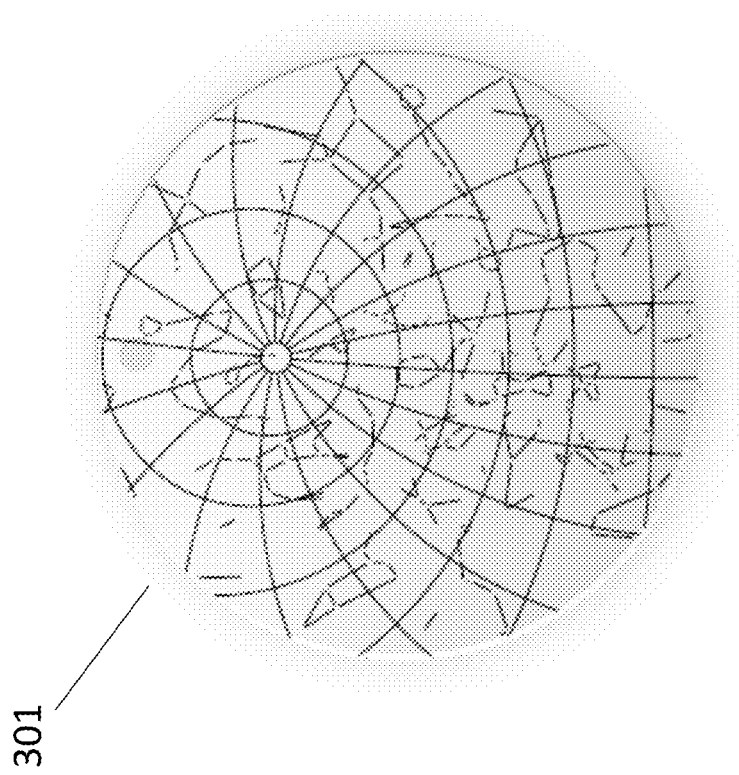
Figure 4K:
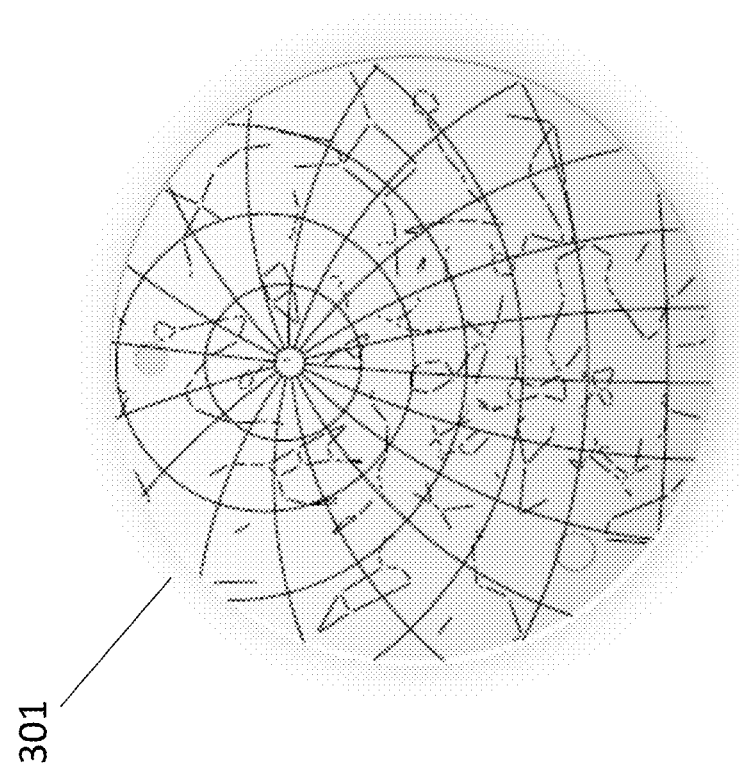

In FIG. 4(a), there is shown a view of the pendant 301 with only stars engraved thereon. In FIG. 4(b), there is shown a view of the pendant 301 with stars and the moon 401 engraved thereon. In FIG. 4(c), there is shown a view of the pendant 301 with stars, the moon and grid lines 403 engraved thereon. In FIG. 4(d), there is shown a view of the pendant 301 with stars and grid lines engraved thereon. In FIG. 4(e), there is shown a view of the pendant 301 with stars and the constellations 405 engraved thereon. In FIG. 4(f), there is shown a view of the pendant 301 with stars, the moon and constellations engraved thereon. In FIG. 4(g), there is shown a view of the pendant 301 with stars, the constellations and grid lines engraved thereon. In FIG. 4(h), there is shown a view of the pendant 301 with stars, the moon, grid lines and constellations engraved thereon. In FIG. 4(i), there is shown a view of the pendant 301 with no stars and only the constellations engraved thereon. In FIG. 4(j), there is shown a view of the pendant 301 with no stars, the moon and constellations engraved thereon. In FIG. 4(k), there is shown a view of the pendant 301 with no stars, the moon, constellations and grid lines engraved thereon. Finally, in FIG. 4(l), there is shown a view of the pendant 301 with no stars or moon, but only constellations and grid lines engraved thereon.

The operation of the invention will be described in more detail below. Through a website, a user enters a location and date of their choosing (that they wish to remember). It is envisaged that instead of a website, a dedicated standalone machine may be provided for carrying out the invention, such as in a jewellery store or a dedicated kiosk in a shopping mall. The software of the computer-implemented method combines a star catalog with software algorithms to calculate the position of the stars as seen from that location, date (and time, if chosen or a default on that night). The star coordinates (positions) are projected onto a 2D plane and rendered as a star map image which the user can preview. This star map shows the stars, constellation lines (asterisms)

connecting the stars and an equatorial or azimuth grid overlay. The user can select to show or hide each of these layers.

It is envisaged that other customization options may be provided such as the moon, the chain size, material or style, indicia (text) on the front or reverse of the pendant, the pendant material, the pendant shape. The software systems of the computer implemented method generate (in one embodiment, DXF and/or SVG format) files for the given date and location, with the grid overlay, constellations and stars according to the user's chosen parameters.

Due to the fact that each pass of a laser engraver is generally designed to remove a thin layer of material (or anneal, or oxidize the surface), overlapping passes of the laser can create different effects or more deeply engraved marks. Consequently, distinct from the rendering of a digital or print star map, care is taken (technology is used/code has been written) to generate the star map files so that most stars do not overlap each other, and constellation lines do not overlap the stars. That said, the method according to the invention does allow grid lines to overlap with constellations. Some overlaps may still occur but the majority are removed. For laser marking, where a paint-like product is sprayed onto the material and the laser anneals the paint to the surface (like a kind of tattoo), a producer will most likely not be as concerned about overlapping lines, and the process can be conducted accordingly.

There is an option in the laser control software used in the computer implemented method according to the invention to load a traditional image and to laser engrave using that traditional image. The power provided to the laser is connected to the brightness in a grayscale image. It is possible to reach a better result by defining the lines and layers individually, but conceivably with additional testing, time and effort, this method could also result in a satisfactory end product. However, at present, this is seen as an easier methodology with a lower quality end product.

The file (or files) containing the star positions, the constellation data, the grid data and the moon data, is imported into a laser (etching, engraving or ablation) machine's control software. The laser is used to engrave (etch or mark) the design on a physical jewelry item. In a preferred embodiment, each layer (background grid, constellation lines and stars) has distinct properties thereof defined. The speed and frequency of the laser as it passes over the surface may result in color variation, for example a brighter oxidation layer versus a dark burn. With certain metals like stainless steel, colors can be produced with the laser treatment. In addition or as an alternative to speed and frequency of the laser, it is possible to also use percentages of full power (between 1% and 100% of the full laser power) and/or multiple passes to create more shallow or deeper channels, which consequently can appear darker, or more reflective. If desired, the back of the jewellery item may also be engraved. Following engraving, the jewelry is polished & cleaned (for example, in an ultrasonic bath). It is envisaged that there will be future embodiments offered where multiple files are loaded and a caddy or tray of pre-engraved "blanks" is used to initiate the engraving of multiple items at the same time.

It will be understood that in the embodiments shown, the article of manufacture is a piece of jewellery, specifically a pendant. However, the article of manufacture could be other items of jewellery such as a watch, a charm for a charm bracelet, a bracelet, a brooch, a tie pin, cufflinks, ring, locket or the like. Indeed the article of manufacture could be a commemorative coin.

The article of manufacture will be constructed from a precious metal such as silver, platinum or gold however it may be constructed from a non-precious metal material, such as stainless steel. Depending on the material used, the laser may be operated to provide different colour effects by adjusting the power or duration of application of the laser in a particular area.

In the embodiments described, reference is made to accessing a star catalogue/an astronomical catalogue containing astrometric and photometric data of a plurality of celestial bodies. One such catalogue that is particularly suitable for use in the implementation of the present invention is the Hipparcos catalogue generated from the European Space Agency's Hipparcos mission.

In order to implement the method using the astronomical catalogue from the Hipparcos mission, the binary catalog was downloaded and the data was parsed, the brightest (>=magnitude 6) star locations and magnitudes were extracted into a web-server friendly format (for example, a large JSON array). The star data is thereafter compacted and included as a catalog file in a star rendering module/software component for transmission to the UCD as part of a webpage rendered on the UCD. With the star catalog data and for a given time and location, the software component can: (i) calculate the position of stars and the moon position, phase and moon tilt angle as they were or will be seen in the night sky; (ii) compute the stereographic projection of the celestial coordinates onto a 2-D spherical plane (draw the globe of stars as a circular map for image rendering); (iii) render equatorial grid and constellation lines on the stereographic projection; and (iv) render the data onto an HTML canvas, which can be rendered on the UCD or transformed into a number of common image formats (e.g. PNG, PDF, JPG). In certain embodiments, the step of rendering the data onto a HTML canvas will be bypassed.

It will be understood that various parts of the present invention are performed in hardware and other parts of the invention may be performed either in hardware and/or software. It will be understood that the method steps and various components of the present invention will be performed largely in software and therefore the present invention extends also to computer programs, on or in a carrier, comprising program instructions for causing a computer or a processor to carry out steps of the method or provide functional components for carrying out those steps. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit. In certain circumstances, a transmissible carrier such as a carrier signal when transmitted through wire and/or cable could carry the computer program in which cases the wire and/or cable constitute the carrier.

It will be further understood that the present invention may be performed on two, three or more devices with certain parts of the invention being performed by one device and other parts of the invention being performed by another device. The devices may be connected together over a communications network, such as, but not limited to, the internet, an intranet, WLAN, LAN or the like. The invention and claims are intended to also cover those instances where the system is operated across two or more devices or pieces of apparatus located in one or more locations, and/or one or more jurisdictions.

In this specification the terms "comprise, comprises, comprised and comprising" and the terms "include, includes, included and including" are all deemed totally interchangeable and should be afforded the widest possible interpretation. The invention is not limited solely to the embodiments hereinbefore described but may be varied in both construction and detail within the scope of the appended claims.

What is claimed is:

1. A computer-implemented method of generating an article of manufacture comprising the steps of:
    receiving a date and location data relating to a user event;
    accessing a star catalogue, determining a star position of a plurality of stars in the star catalogue relative to the date and location data;
    projecting the star positions of the plurality of stars onto a two-dimensional (2D) plane;
    generating a computer-readable file for the star positions;
    providing the computer-readable file to a laser engraving machine;
    the laser-engraving machine engraving the article of manufacture according to the computer-readable file; and
    in which the method comprises the intermediate step of, prior to providing the computer-readable file to a laser engraving machine, passing the computer-readable file through an anti-overlap filter in which overlaps between stars, constellation lines and/or grid overlays are minimized.

2. The computer-implemented method as claimed in claim 1 in which the step of providing the computer-readable file to a laser engraving machine further comprises providing a computer-readable file containing a plurality of separate and distinct star position files.

3. The computer-implemented method as claimed in claim 2 in which the method comprises the laser engraving machine engraving a plurality of articles of manufacture in a batch in accordance with the computer-readable file.

4. The computer-implemented method as claimed in claim 3 in which the plurality of articles of manufacture are engraved simultaneously.

5. The computer-implemented method as claimed in claim 1 in which the computer-readable file provided to the laser engraving machine comprises instructions to carry out the engraving in multiple stages.

6. The computer-implemented method as claimed in claim 5 in which the multiple stages comprise separate stages for two or more of:
    (i) star positions;
    (ii) constellation lines;
    (iii) equatorial grid overlay;
    (iv) azimuth grid overlay;
    (v) moon position.

7. The computer-implemented method as claimed in claim 1 in which the step of generating a computer-readable file for the star positions comprises generating an image of the star positions on a 2D plane and providing that image to the laser engraving machine for engraving.

8. The computer-implemented method as claimed in claim 7 in which the image is a grey scale image and the method comprises adjusting the power or duration of the laser engraving machine in line with the brightness of the grey-scale image.

9. The computer-implemented method as claimed in claim 1 in which the step of providing the computer-readable file to a laser engraving machine further comprises including indicia to be engraved on the article of manufacture.

10. The computer-implemented method as claimed in claim 9 in which the step of the laser-engraving machine engraving the article of manufacture according to the computer-readable file further comprises the laser-engraving machine engraving the indicia onto the article of manufacture.

11. The computer-implemented method as claimed in claim 1 in which the method comprises the additional step of receiving a time data relating to a user event and the step of determining the position of the stars relative to the date and location data further comprises determining the positions of the stars relative to the time data and the date and location data.

12. The computer-implemented method as claimed in claim 1 in which the method comprises the intermediate step of rendering the 2D plane on a graphical user interface (GUI) of a user computing device (UCD).

13. The computer-implemented method as claimed in claim 1 in which the step of projecting the star positions onto a 2D plane comprises projecting one or more of:
    (i) star positions;
    (ii) constellation lines;
    (iii) equatorial grid overlay;
    (iv) azimuth grid overlay;
    (v) moon position;
    onto a 2D plane.

14. The computer-implemented method as claimed in claim 1 in which the step of generating a computer-readable file for the star positions comprises generating a computer-readable file containing one or more of:
    (i) star positions;
    (ii) constellation lines;
    (iii) equatorial grid overlay;
    (iv) azimuth grid overlay;
    (v) moon position.

15. The computer-implemented method as claimed in claim 1 in which the step of generating a computer-readable file comprises generating one or more of a DXF format file and a SVG format file.

16. The computer-implemented method as claimed in claim 1 in which the laser engraving machine is one of a laser etching machine, a laser engraving machine or a laser ablation machine.

17. The computer-implemented method as claimed in claim 1 in which the step of generating a computer-readable file for the star positions comprises incorporating instructions for one or more of laser speed; laser frequency; laser power level; and number of laser passes for the components to be engraved.

* * * * *